United States Patent
Xiao et al.

(10) Patent No.: US 11,128,447 B2
(45) Date of Patent: Sep. 21, 2021

(54) CRYPTOGRAPHIC OPERATION METHOD, WORKING KEY CREATION METHOD, CRYPTOGRAPHIC SERVICE PLATFORM, AND CRYPTOGRAPHIC SERVICE DEVICE

(71) Applicant: Advanced New Technologies Co., Ltd., Grand Cayman (KY)

(72) Inventors: Shuting Xiao, Zhejiang (CN); Xiaodan Lin, Zhejiang (CN); Haifeng Fang, Zhejiang (CN); Shengcai Gu, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/106,762

(22) Filed: Nov. 30, 2020

(65) Prior Publication Data

US 2021/0099286 A1 Apr. 1, 2021

Related U.S. Application Data

(63) Continuation of application No. PCT/CN2019/096662, filed on Jul. 19, 2019.

(30) Foreign Application Priority Data

Aug. 31, 2018 (CN) .......................... 201811012441.8

(51) Int. Cl.
*H04L 9/08* (2006.01)
*H04L 9/06* (2006.01)
(Continued)

(52) U.S. Cl.
CPC ............ *H04L 9/083* (2013.01); *H04L 9/0618* (2013.01); *H04L 9/30* (2013.01); *H04L 9/3242* (2013.01)

(58) Field of Classification Search
CPC ......... H04L 9/083; H04L 9/0618; H04L 9/30; H04L 9/3242
See application file for complete search history.

(56) References Cited

U.S. PATENT DOCUMENTS

| 8,966,267 B1 * | 2/2015 | Pahl ...................... H04L 9/0844 713/171 |
| 2002/0061108 A1 * | 5/2002 | Shinohara ............... H04L 9/083 380/278 |

(Continued)

FOREIGN PATENT DOCUMENTS

| CN | 101 141250 A | 3/2008 |
| CN | 102148799 A | 8/2011 |

(Continued)

OTHER PUBLICATIONS

International Search Report in Application No. PCT/CN2019/096662, from the China National Intellectual Property Administration (ISA/CN), dated Oct. 18, 2019.

*Primary Examiner* — J. Brant Murphy
(74) *Attorney, Agent, or Firm* — Finnegan, Henderson, Farabow, Garrett & Dunner, LLP

(57) ABSTRACT

A cryptographic service device includes: a processor; and a memory storing instructions executable by the processor, wherein the processor is configured to execute the instructions to operate as a registration module, a working key creation module, and a cryptographic operation calling module. The registration module is configured to call a primary security module to generate a master key for a newly added secondary security module. The working key creation module is configured to receive a working key creation request of a business system, call the primary security module to generate a working key for the business system, and acquire a working key ciphertext. The cryptographic operation calling module is configured to receive a cryptographic opera- (Continued)

tion request of the business system; call a target security module, and obtain an operation result of the target security module.

15 Claims, 8 Drawing Sheets

(51) Int. Cl.
*H04L 9/30* (2006.01)
*H04L 9/32* (2006.01)

(56) References Cited

U.S. PATENT DOCUMENTS

| | | |
|---|---|---|
| 2006/0288231 A1 | 12/2006 | Kim et al. |
| 2010/0235626 A1* | 9/2010 | Kwon ................ H04N 21/4623 713/156 |
| 2012/0179916 A1* | 7/2012 | Staker ................. G06F 9/45558 713/189 |
| 2014/0112470 A1 | 4/2014 | Shen et al. |
| 2016/0028547 A1* | 1/2016 | Yao ........................ H04L 9/0825 713/176 |
| 2016/0028548 A1* | 1/2016 | Yao ........................ H04L 63/062 713/176 |
| 2016/0036793 A1* | 2/2016 | Su .......................... H04L 9/0836 713/171 |
| 2016/0191239 A1 | 6/2016 | Murray |
| 2017/0310479 A1* | 10/2017 | Sato ....................... H04L 9/0822 |

FOREIGN PATENT DOCUMENTS

| | | |
|---|---|---|
| CN | 103051446 A | 4/2013 |
| CN | 103269480 A | 8/2013 |
| CN | 106209353 A | 12/2016 |
| CN | 106453612 A | 2/2017 |
| CN | 107070642 A | 8/2017 |
| WO | WO 2017076911 A1 | 5/2017 |

* cited by examiner

US 11,128,447 B2

CRYPTOGRAPHIC OPERATION METHOD, WORKING KEY CREATION METHOD, CRYPTOGRAPHIC SERVICE PLATFORM, AND CRYPTOGRAPHIC SERVICE DEVICE

CROSS-REFERENCE TO RELATED APPLICATIONS

This application is a continuation application of International Application No. PCT/CN2019/096662, filed on Jul. 19, 2019, which is based upon and claims priority to Chinese Patent Application No. 201811012441.8, filed on Aug. 31, 2018, the entire content of all of which is incorporated herein by reference.

TECHNICAL FIELD

The present specification relates to the technical field of cryptography, and in particular to a cryptographic operation method, a working key creation method, a cryptographic service platform, and a cryptographic service device.

BACKGROUND

With the development of Internet technology, various business systems emerge in an endless stream, bringing great convenience to people's work and life, and also promoting the economic growth and social progress. Cryptographic technology is an important technical means to protect business systems of banks, securities, or transactions to ensure data confidentiality, integrity, non-repudiation, and availability during data storage, transmission, and access control.

For example, enterprises can configure a cryptographic service platform. The cryptographic service platform is a system platform that provides key management and cryptographic operation services based on security modules. The platform, which functions as a server of the business system, can provide application layer cryptographic services such as message check, data encryption and decryption, signature verification, etc. for the business system, thereby ensuring the security of data in the processes of storage, transmission and application, and prevent data from being stolen or maliciously tampered with. Based on this, how to provide a more stable cryptographic service platform becomes an urgent technical problem to be solved.

SUMMARY

According to a first aspect of embodiments of the present specification, a cryptographic service device is provided. The cryptographic service device is connected to a primary security module, and includes: a processor; and a memory storing instructions executable by the processor, wherein the processor is configured to execute the instructions to operate as a registration module, a working key creation module, and a cryptographic operation calling module. The registration module is configured to call the primary security module to generate a master key for a newly added secondary security module. The working key creation module is configured to receive a working key creation request of a business system, call the primary security module to generate a working key for the business system, and acquire a working key ciphertext encrypted by the master key of the primary security module and a working key ciphertext encrypted by the master key of each secondary security module connected with the cryptographic service device. The cryptographic operation calling module is configured to receive a cryptographic operation request of the business system, the cryptographic operation request carrying data to be operated; determine a target security module responding to the cryptographic operation request; call the target security module using a working key ciphertext corresponding to the target security module and the data to be operated as input, and acquire an operation result of the target security module, the operation result being obtained by the target security module by decrypting the working key ciphertext to obtain the working key using a stored master key, and encrypting the data to be operated using the decrypted working key.

According to a second aspect of the embodiments of the present specification, a cryptographic operation method is provided, including: receiving a cryptographic operation request initiated by a business system, the cryptographic operation request carrying data to be operated; determining a target security module responding to the cryptographic operation request, the target security module being one of a primary security module or at least one secondary security module, and a master key of the secondary security module being generated by the primary security module; acquiring a working key ciphertext corresponding to the target security module, the working key ciphertext being obtained when the primary security module encrypts a working key using a master key of the target security module, the working key being created by the primary security module for the business system; and calling the target security module using the working key ciphertext and the data to be operated as input, acquiring an operation result returned by the target security module, and sending the operation result to the business system, the operation result being obtained by the target security module by decrypting the working key ciphertext to obtain the working key using the stored master key of the target security module, and encrypting the data to be operated using the decrypted working key.

According to a third aspect of the embodiments of the present specification, a cryptographic service device is provided, including a processor, and a memory storing instructions executable by the processor, wherein the processor is configured to: receive a cryptographic operation request initiated by a business system, the cryptographic operation request carrying data to be operated; determine a target security module responding to the cryptographic operation request, the target security module being one of a primary security module or at least one secondary security module, and a master key of the secondary security module being generated by the primary security module; acquire a working key ciphertext of the target security module, the working key ciphertext being obtained when the primary security module encrypts a working key using a master key of the target security module, the working key being created by the primary security module for the business system; and call the target security module using the working key ciphertext and the data to be operated as input, acquire an operation result returned by the target security module and send the operation result to the business system, the operation result being obtained by the target security module by decrypting the working key ciphertext to obtain the working key using the stored master key, and encrypting the data to be operated using the decrypted working key.

According to a fourth aspect of the embodiments of the present specification, a working key creation method is provided, including: receiving a working key creation request of a business system; and calling a primary security module to generate a working key for the business system, and acquiring a working key ciphertext encrypted by a master key of the primary security module and a working key ciphertext encrypted by a master key of each connected secondary security module, returned by the primary security module, the master key of the secondary security module being generated by the primary security module for the secondary security module by calling the primary security module.

According to a fifth aspect of the embodiments of the present specification, a cryptographic service device is provided, including a processor, and a memory storing instructions executable by the processor, wherein the processor is configured to: receive a working key creation request of a business system; and call a primary security module to generate a working key for the business system, and acquire a working key ciphertext encrypted by a master key of the primary security module and a working key ciphertext encrypted by a master key of each connected secondary security module, returned by the primary security module, the master key of the secondary security module being generated by the primary security module for the secondary security module by calling the primary security module.

According to a sixth aspect of the embodiments of the present specification, a non-transitory computer-readable storage medium has stored therein instructions that, when executed by a processor of a device, cause the device to perform the cryptographic operation method according to the second aspect.

The technical solution provided by the embodiments of the present specification can include the following beneficial effects.

In the embodiments of the present specification, one of the security modules connected to the cryptographic service device functions as the primary security module, the key management function of the cryptographic service device is provided by the primary security module, the primary security module is configured to generate a key, and the primary security module and other secondary security modules provide cryptographic operation functions required by the cryptographic service device.

Master keys of the secondary security modules are generated by the primary security module, and the working key of the business system is also generated by the primary security module. In addition, the cryptographic service device stores the working key ciphertext encrypted by the master key of the primary security module, and the working key ciphertext encrypted by the master key of each secondary security module. Therefore, the master keys are stored in the primary security module. The master keys, which function as sensitive security parameter plaintexts, do not exceed a boundary of the security module, and the security of the keys is not put at risk, thereby meeting key security requirements. Moreover, the cryptographic service device can call, e.g., invoke any one of the security modules to respond to the cryptographic operation request of the business system, and therefore, the cryptographic service device can be compatible with various security modules. The cryptographic service device is not be bound by a single security module manufacturer, the requirements of using various security modules are met, and the cryptographic service device can provide a stable cryptographic service.

It should be understood that the above general description and the following detailed description are only exemplary and explanatory, and do not limit the present specification.

BRIEF DESCRIPTION OF THE DRAWINGS

The accompanying drawings are incorporated into the present specification and constitute a part of the present specification, show embodiments according to the present specification, and explain the principle of the present specification together with the present specification.

DETAILED DESCRIPTION

Example embodiments will be described in detail here, and examples thereof are shown in the accompanying drawings. When the following description refers to the accompanying drawings, the same numerals in the different accompanying drawings indicate the same or similar elements, unless otherwise indicated. The implementations described in the following example embodiments do not represent all implementations consistent with the present specification. Rather, they are only examples of apparatuses and methods consistent with some aspects of the present specification as recited in the appended claims.

Terms used in the present specification are for describing specific examples only, and are not intended to limit the present specification. The term "and/or" used herein refers to and cover any or all possible combinations of one or more associated items listed.

Figure 1:
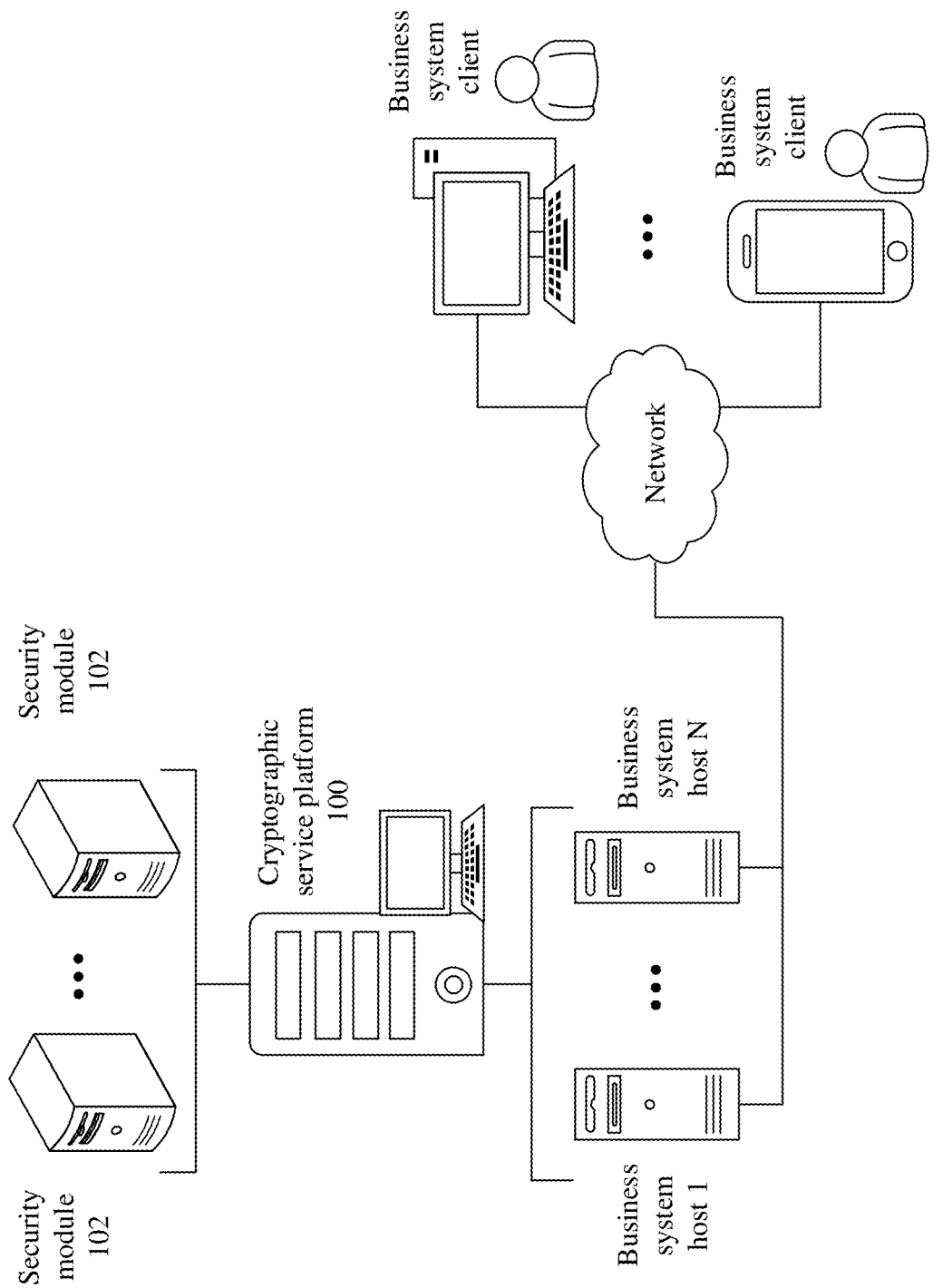
FIG. 1 is an application scenario diagram of a cryptographic service platform according to an example embodiment.

FIG. 1 is an application scenario diagram of a cryptographic service platform 100 according to an example embodiment. In FIG. 1, the cryptographic service platform 100 communicates with an application system host. The application system host uses a cryptographic service by calling, e.g., invoking, an interface provided by the cryptographic service platform 100. Bottom services such as cryptographic operation, etc. are achieved by the cryptographic service platform 100 calling a security module 102.

The security module 102 may contain a cryptographic algorithm and a security function, and may be independent software, hardware, firmware, or a combination thereof to realize a key management mechanism. The security module 102 may be contained in a cryptographic boundary. The cryptographic boundary refers to: a clearly defined continuous sideline. The sideline establishes a physical and/or logical boundary of the security module, and contains all hardware, software, and/or firmware components of the security module 102.

Conventionally, security modules from different manufacturers have different generation algorithms for master keys. In order to avoid being bound by a single manufacturer and improve the robustness of cryptographic service platform, the cryptographic service platform in the embodiments of the present specification is built based on various security modules. Therefore, the cryptographic service platform is connected with various security modules. When being connected to various security modules, the cryptographic service platform needs to be compatible with various security modules to uniformly provide a cryptographic service for the business system while meeting the security of the cryptographic service.

In embodiments of the present specification, one of the security modules 102 connected to the cryptographic service platform 100 functions as a primary security module, and in a key management function of the cryptographic service platform 100, the primary security module generates a key. Other security modules 102, except the primary security module, are referred to as secondary security modules in the embodiments of the present specification. Both the secondary security modules and the primary security module may provide cryptographic operation functions required by the cryptographic service platform 100.

In an embodiment, master keys of the secondary security modules are generated by the primary security module, and a working key of a business system is also generated by the primary security module. For example, the business system may include business system host 1, . . . , business system host N connected to one or more business system clients via a network. In addition, the cryptographic service platform 100 stores the working key ciphertext encrypted by the master key of the primary security module, and the working key ciphertext encrypted by the master key of each secondary security module. Therefore, in the embodiment, the master keys are stored in the primary security module. Master keys and working key ciphertexts, which function as sensitive security parameters, may not exceed a boundary of the security module, and therefore the security of the keys is not put at risk, thereby meeting key security requirements. Moreover, the cryptographic service platform 100 can call any one of the security modules 102 to respond to a cryptographic operation request of the business system. Therefore, the cryptographic service platform 100 may not be bound by a single security module manufacturer, the requirements of using various security modules are met, and the cryptographic service platform 100 can provide a more stable cryptographic service.

Figure 2A:
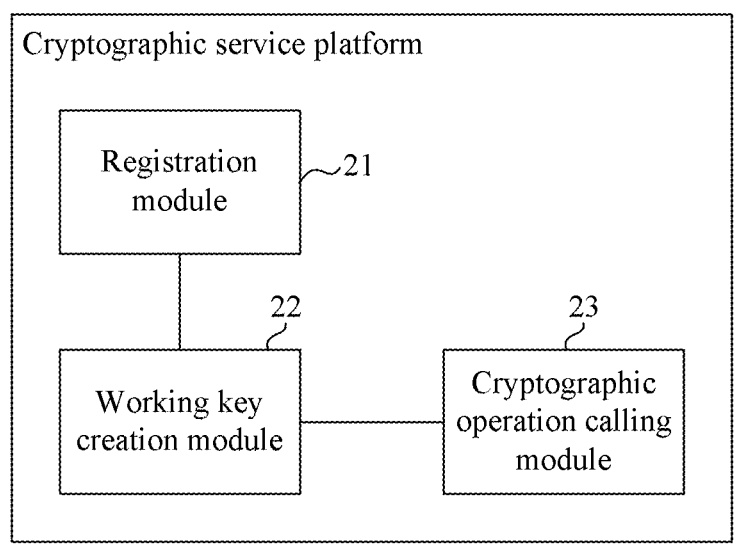
FIG. 2A is a block diagram of a cryptographic service device operating as a cryptographic service platform, according to an example embodiment.

FIG. 2A is a block diagram of a cryptographic service device operating as a cryptographic service platform, according to an example embodiment. For example, the cryptographic service platform may be the cryptographic service platform 100 (FIG. 1). As shown in FIG. 2A, the cryptographic service platform may include a registration module 21, a working key creation module 22, and a cryptographic operation calling module 23, which are respectively configured to register secondary security modules, create a working key of a business system, and call a security module to respond to a cryptographic operation request of the business system.

In an embodiment, registration module 21 is configured to call the primary security module to generate a master key for a newly added secondary security module.

In an embodiment, working key creation module 22 is configured to receive a working key creation request of the business system, call the primary security module to generate a working key for the business system, and acquire a working key ciphertext encrypted by the master key of the primary security module and a working key ciphertext encrypted by the master key of each connected secondary security module, returned by the primary security module.

In an embodiment, cryptographic operation calling module 23 is configured to receive the cryptographic operation request of the business system, the cryptographic operation request carrying data to be operated; determine a target security module responding to the cryptographic operation request; call the target security module using a working key ciphertext corresponding to the target security module and the data to be operated as input, and acquire an operation result of the target security module, the operation result being obtained by the target security module by decrypting the working key ciphertext to obtain the working key using the stored master key, and then encrypting the data to be operated using the decrypted working key.

Registration of secondary security modules will be described below. In an embodiment, a master key is configured for a security module before working, and the security module uses the master key to encrypt a key to be protected. The security module per se has a key derivation algorithm to generate a key; however, in the embodiment, the primary security module generates master keys for the secondary security modules. For example, the cryptographic service platform may call a key generation interface of the primary security module, and after the primary security module is called, the master keys of the secondary security modules may be generated by using the key derivation algorithm. By using the primary security module to generate a master key of each secondary security module, the primary security module obtains the master key of each secondary security module, thereby encrypting the working key by using the master key of each secondary security module when the working key of the business system is generated, which will be further described below.

After the primary security module generates the master key of the secondary security module, the master key may be transmitted to the secondary security module by encryption, etc. Specific encryption transmission modes may be flexibly configured according to actual needs, thereby ensuring the security of the transmission process. As an example, after the primary security module generates the master key, two or more key components are generated based on the master key, and all the key components are output to respective key management entities, respectively. The key management entities transmit all the key components to the secondary security module, respectively, so as to allow the secondary security module to generate the master key according to the key components input by each of the key management entities. The key management entity may be a key manager Each key manager obtains one of the key components, respectively. Each key manager may input the key component it holds through a control input interface of a secondary security module. The secondary security module may generate a master key for working after acquiring all the key components. In the present embodiment, the key components are generated and transmitted to the secondary security module by the various key management entities. Since each of the key management entities only owns a key component, even if the key component is leaked, it is relatively difficult to obtain all the key components. Therefore, the risk of keys being leaked and attacked can be reduced, and the security of master key transmission is improved.

In some other examples, the asymmetric cryptographic technology may be used to perform encryption transmission on the master key. As an example, the secondary security module may generate asymmetric keys including a target public key and a target private key. The cryptographic service platform may obtain the target public key of the secondary security module. The cryptographic service platform may call the primary security module and transmit the target public key to the primary security module. After the primary security module generates the master key of the secondary security module, the target public key is used to encrypt the generated master key to obtain a master key ciphertext. The primary security module returns the master key ciphertext to the cryptographic service platform. After receiving the master key ciphertext, the cryptographic service platform sends the master key ciphertext to the secondary security module. The secondary security module decrypts the master key ciphertext using the target private key to obtain the master key.

The above process involves the transmission of the target public key. In an embodiment, the risk of the target public key being tampered with during the transmission process may be further reduced through the following method, thereby ensuring the secure transmission of the master key of the secondary security module. As an example, the cryptographic service platform calls the primary security module and transmits the target public key to the primary security module, and the primary security module authenticates the target public key. The authentication process may be that the primary security module performs message authentication code calculation on the target public key using its own master key so as to obtain a message authentication code value (i.e., the check value of the target public key). The primary security module returns the calculated message authentication code value to the cryptographic service platform. The cryptographic service platform calls the primary security module and transmits the target public key and the message authentication code value to the primary security module. After verifying the target public key based on the message authentication code value and determining that the target public key is legal (indicating that the target public key is safe, has not been tampered with, etc.), the primary security module generates the master key of the secondary security module for the secondary security module, and encrypts the generated master key using the target public key so as to obtain the master key ciphertext and return the master key ciphertext to the cryptographic service platform.

Figure 2B:
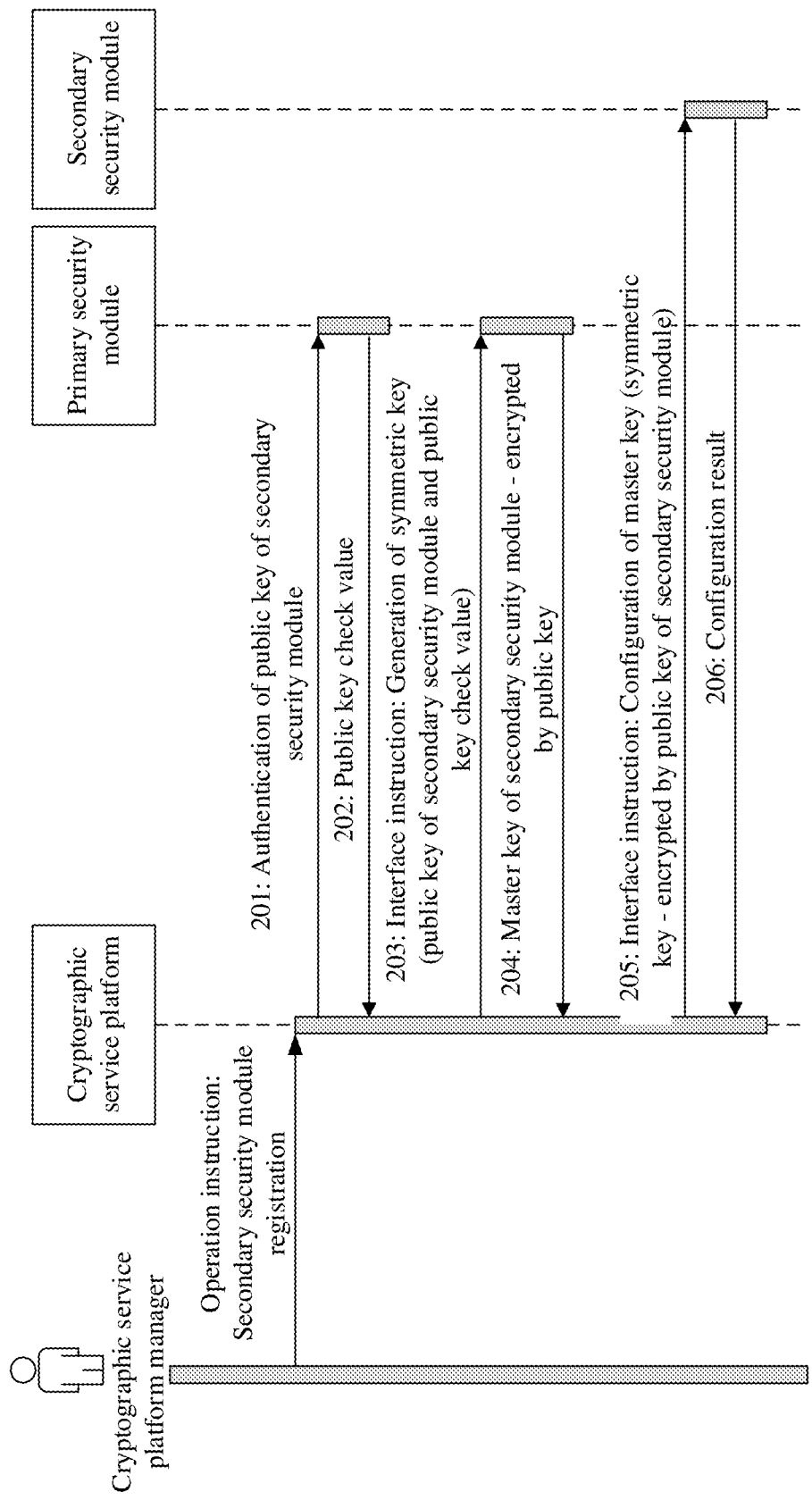
FIG. 2B is a schematic diagram of a registration process of a secondary security module according to an example embodiment.

FIG. 2B is a schematic diagram of a registration process of a secondary security module according to an example embodiment. For example, a manager of the cryptographic service platform may send an operation instruction for registering a secondary security module to the cryptographic service platform. After receiving the instruction, the cryptographic service platform performs the following operations.

In operation 201, the cryptographic service platform calls a public key authentication service interface of the primary security module. The primary security module authenticates the target public key of the secondary security module. For example, the secondary security module generates an asymmetric key pair including the target public key and the target private key in advance, and provides the asymmetric key pair to the cryptographic service platform.

In operation 202, the primary security module performs message authentication code calculation on the target public key using its own master key, obtains a public key check value, and returns the public key check value to the cryptographic service platform.

In operation 203, the cryptographic service platform calls a symmetric key generation instruction of the primary security module, and transmits the target public key and public key check value of the secondary security module.

In operation 204, the primary security module checks the validity of the target public key based on the public key check value, and after the check is passed, generates a symmetric key. The symmetric key is encrypted using the target public key, and the encrypted symmetric key is returned.

In operation 205, the cryptographic service platform calls a master key control input configuration interface of the secondary key module, and transmits the symmetric key encrypted with the target public key.

In operation 206, the secondary security module receives the master key configuration instruction, decrypts the master key configuration instruction using the target private key to obtain the symmetric key, and configures the symmetric key as a working master key.

In an embodiment, the primary security module may save the master key of each of the secondary security modules, or the primary security module may encrypt the master key of the secondary security module using its own master key, so as to obtain a master key ciphertext of the secondary security module, and transmit the master key ciphertext to the cryptographic service platform for storage.

Working key creation for a business system will be described below. For example, the working key may be a key created for a business system by a security module for providing a cryptographic operation function for the business system.

In an embodiment, a working key creation process may be as follows. A working key creation request of a business system is received. The primary security module is called to generate a working key for the business system. A working key ciphertext encrypted by the master key of the primary security module and a working key ciphertext encrypted by the master key of each connected secondary security module, fed back by the primary security module, are acquired. In the embodiment, after the working key of the business system is generated by the primary security module, the primary security module generates multiple working key ciphertexts and provides the working key ciphertexts to the cryptographic service platform for storage, thereby allowing the working key ciphertexts to be used in a subsequent cryptographic operation treatment process.

Figure 2C:
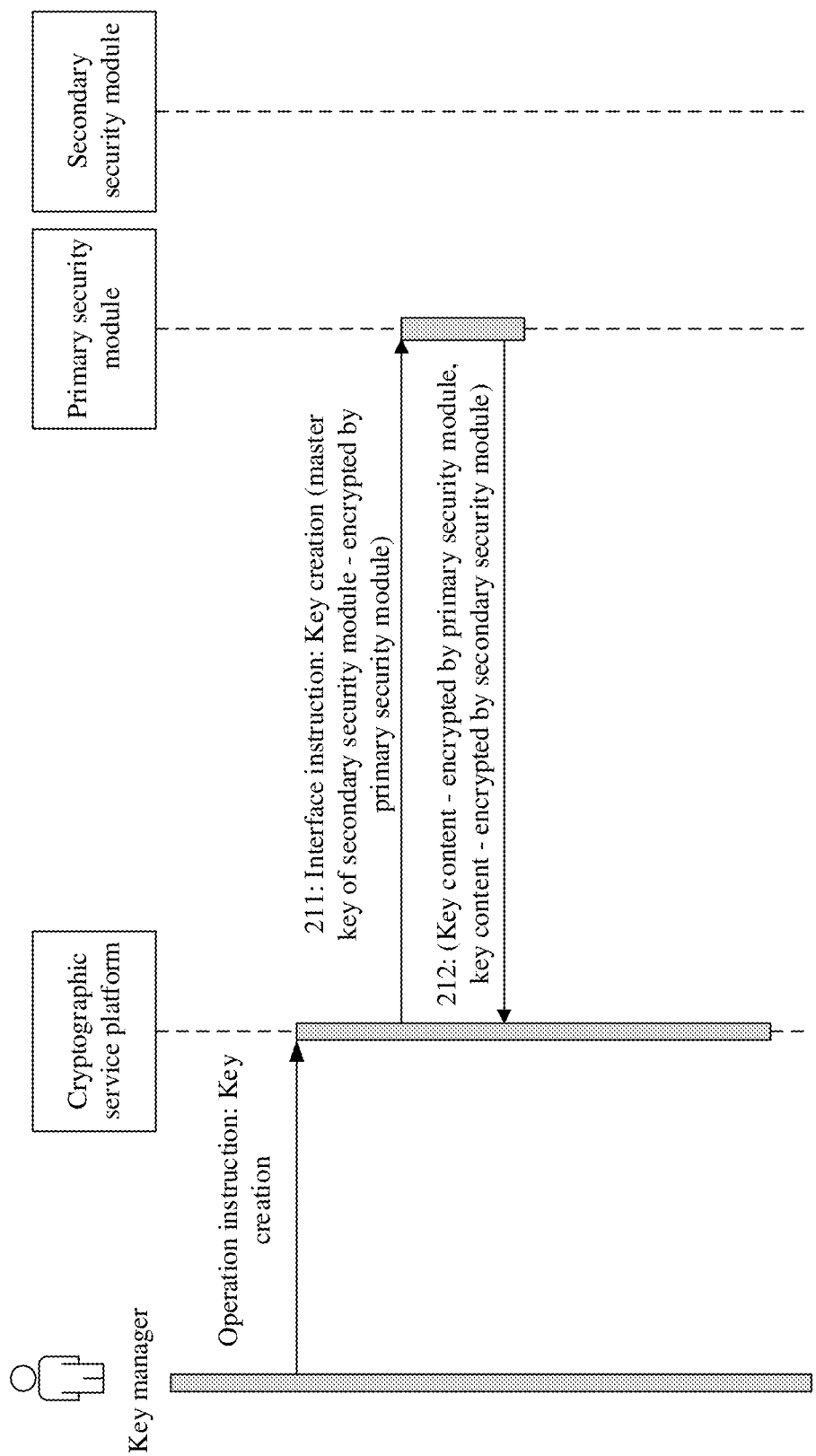
FIG. 2C is a schematic diagram of a working key creation process according to an example embodiment.

FIG. 2C is a schematic diagram of a process of working key creation according to an example embodiment. For example, a key manager may initiate a key creation operation instruction. After receiving the operation instruction, the cryptographic service platform performs the following operations.

In operation 211, the cryptographic service platform calls a working key creation interface of the primary security module, and at the same time inputs a master key ciphertext of each secondary security module. For example, the ciphertext is encrypted by the master key of the primary security module.

In operation 212, after the primary security module is called, a key derivation module is used to generate a working key, and the working key is returned after being encrypted by a master key of the primary security module and the master key of each secondary security module, respectively. For example, there may be multiple working keys. A private key and a secret key may be encrypted, and the public key may be returned directly in plaintext without encryption. The public key may also be encrypted as needed, and flexible configuration may be performed.

After the execution is completed, the cryptographic service platform records multiple working key ciphertexts: the ciphertext encrypted by the master key of the primary security module, and ciphertext encrypted by the master key of each secondary security module.

Cryptographic operation will be described below. In embodiments of the specification, the cryptographic service platform provides cryptographic operation services to the business system. The cryptographic service platform may receive a cryptographic operation request from the business system, the cryptographic operation request carrying data to be operated. Generally, the cryptographic service platform may provide services to multiple business systems, and each business system may also correspond to multiple working keys. Therefore, the cryptographic operation request also carries a key identifier, for the cryptographic service platform to determine which working key needs to be used for providing cryptographic operation services.

Since there are multiple security modules connected, the cryptographic service platform may select one of the security modules to respond to the cryptographic calculation request. In order to facilitate differentiation, the selected security module is referred to as a target security module. In an embodiment, the selection method of the cryptographic service platform may be flexibly configured as needed, for example, depending on the current processing capability of each security module, the number of tasks being processed, etc.

After determining the target security module responding to the cryptographic operation request, the cryptographic service platform may obtain the working key ciphertext corresponding to the target security module from the multiple stored working key ciphertexts. The cryptographic service platform may call the target security module using the working key ciphertext as input. After being called, the target security module may decrypt the working key ciphertext using its own stored master key to obtain the working key, and then perform an operation on the data to be operated using the working key. The operation result may be returned to the cryptographic service platform, and then returned to the business system by the cryptographic service platform.

Figure 2D:
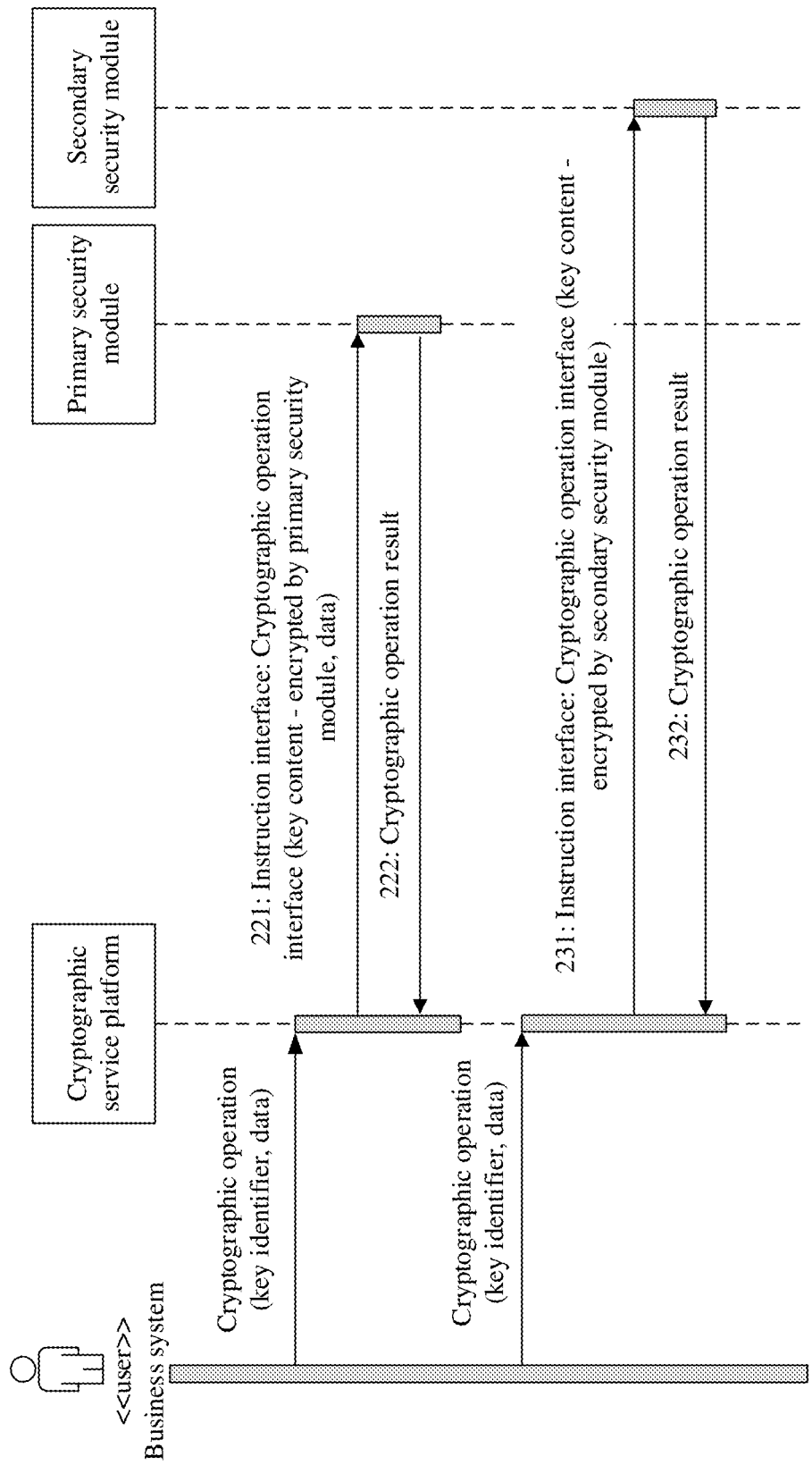
FIG. 2D is a schematic diagram of a cryptographic operation according to an example embodiment.

FIG. 2D is a schematic diagram of a cryptographic operation according to an example embodiment. For example, after receiving the cryptographic operation request, the cryptographic service platform determines which security module needs to be used for this operation. Specific selection logic is not limited, and may be formulated according to requirements of the traffic management by the cryptographic service platform on security modules.

In operation 221, if the selection result is the primary security module, the cryptographic service platform calls a cryptographic operation interface of the primary security module, and the input data is key content of a working cryptogram, e.g., encrypted by the primary security module, and the data to be operated.

In operation 222, the primary security module performs decryption using the internal master key to obtain a working key plaintext, performs cryptographic operation on the data to be operated, and returns the operation result to the cryptographic service platform.

In operation 231, if the selection result is a secondary security module, the cryptographic service platform calls a cryptographic operation interface of the secondary security module, and input data is the key content of the working cryptogram, e.g., encrypted by the secondary security module, and the data to be operated.

In operation 232, the secondary security module performs decryption using the internal master key to obtain a working key plaintext, performs cryptographic operation on the data to be operated, and returns the operation result to the cryptographic service platform.

In embodiments of the present specification, the cryptographic service platform may be implemented by a computer device, such as a server, etc. In addition, each security module (FIG. 1) and each module of the cryptographic service platform (FIG. 2A) may be implemented by software, or hardware, or a combination of hardware and software. For example, the module may be formed by a processor where the software is located reading a corresponding computer program instruction in a nonvolatile memory into a memory and running the computer program.

Figure 3:
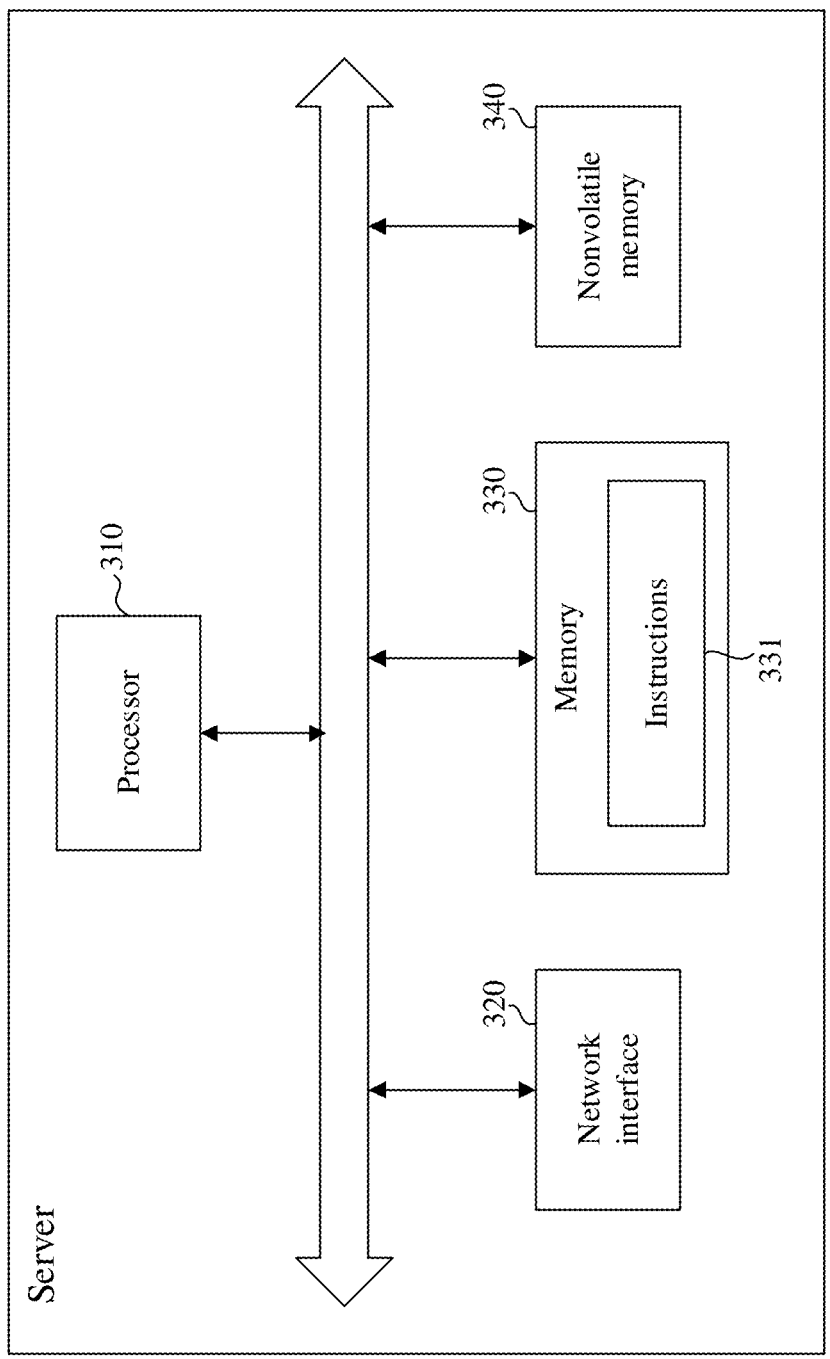
FIG. 3 is a schematic diagram of a computer device implementing a cryptographic service platform, according to an example embodiment.

FIG. 3 is a schematic diagram of a computer device implementing a cryptographic service platform, according to an example embodiment. For example, the computer device may be a server, and include a processor 310, a network interface 320, and a memory 330, and a nonvolatile memory 340. For example, the memory 330 may include instructions 331 for implementing the cryptographic service platform.

Figure 4:
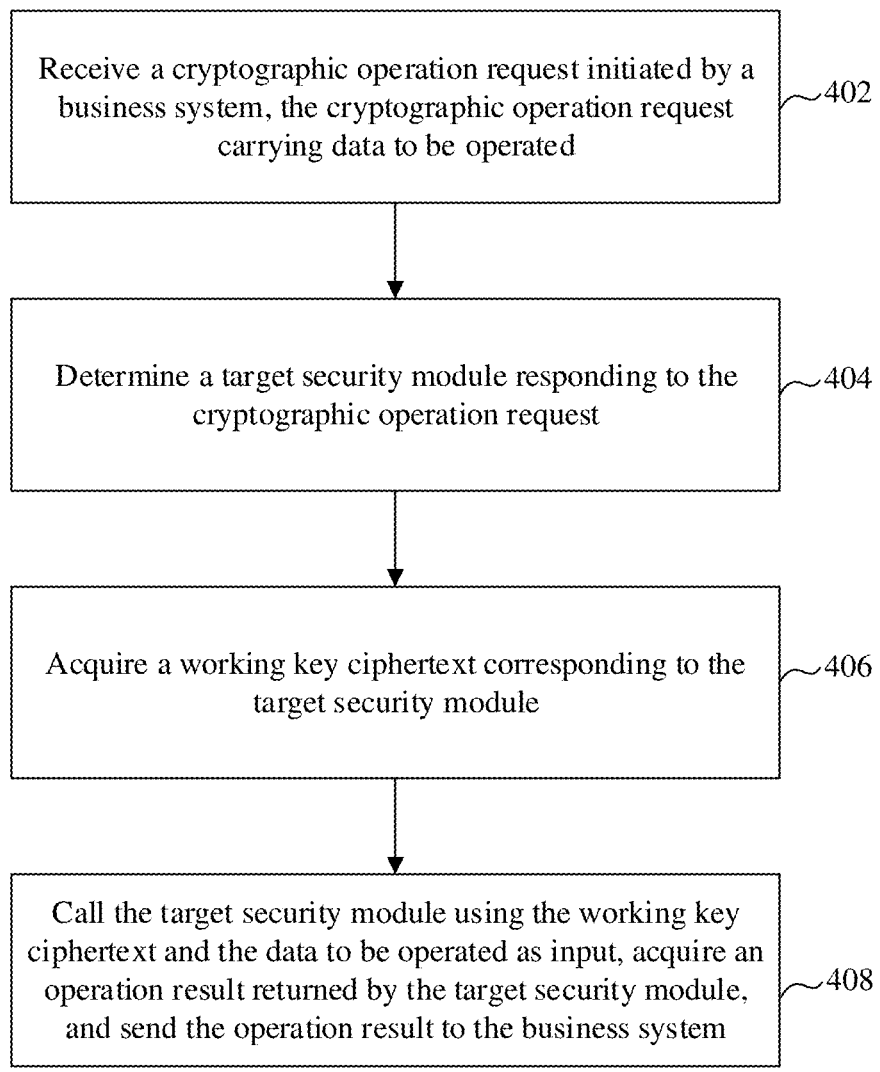
FIG. 4 is a flow chart of a cryptographic operation method according to an example embodiment.

FIG. 4 is a flow chart of a cryptographic operation method according to an example embodiment.

In step 402, a cryptographic operation request initiated by a business system is received, the cryptographic operation request carrying data to be operated.

In step 404, a target security module responding to the cryptographic operation request is determined, the target security module being one of a primary security module or at least one secondary security module, and a master key of the secondary security module being generated by the primary security module.

In step 406, a working key ciphertext corresponding to the target security module is acquired, the working key ciphertext being a ciphertext that is obtained when the primary security module encrypts the working key using the master key of the target security module, the working key being created by the primary security module for the business system.

In step 408, the target security module is called using the working key ciphertext and the data to be operated as input. An operation result returned by the target security module is acquired and sent to the business system. The operation result is obtained by the target security module by decrypting the working key ciphertext to obtain the working key using the stored master key, and then encrypting the data to be operated using the decrypted working key.

In an embodiment, the master key of the secondary security module is obtained by: acquiring a target public key generated by the secondary security module; calling the primary security module using the target public key as input, generating, by the primary security module, the master key of the secondary security module, and encrypting the generated master key using the target public key so as to obtain a master key ciphertext; and sending the master key ciphertext to the secondary security module, and decrypting, by the secondary security module, the master key ciphertext using a target private key corresponding to the target public key so as to obtain the master key.

In an embodiment, calling the primary security module using the target public key as input, and generating, by the primary security module, the master key of the secondary security module includes: acquiring a public key check value obtained when the primary security module performs message authentication code calculation on the target public key; and calling the primary security module using the target public key and the public key check value as input, and generating the master key of the secondary security module after the primary security module checks the validity of the input target public key based on the public key check value.

In an embodiment, the master key of the secondary security module is obtained by: calling the primary security module, and acquiring two or more key components of the master key of the secondary security module after the primary security module generates the master key; and transmitting the two or more key components to each key management entity, respectively, and transmitting, by the key management entity, the key components to the secondary security module respectively so as to allow the secondary security module to generate the master key according to each key component.

In an embodiment, the method further includes: receiving and storing the master key ciphertext of the secondary security module returned by the primary security module, the master key ciphertext being encrypted by the master key of the primary security module.

For the implementation process of each step in the above cryptographic calculation method, reference may be made to the implementation process of the function and effect of each module in the above cryptographic service platform, which will not be repeated here.

Figure 5:
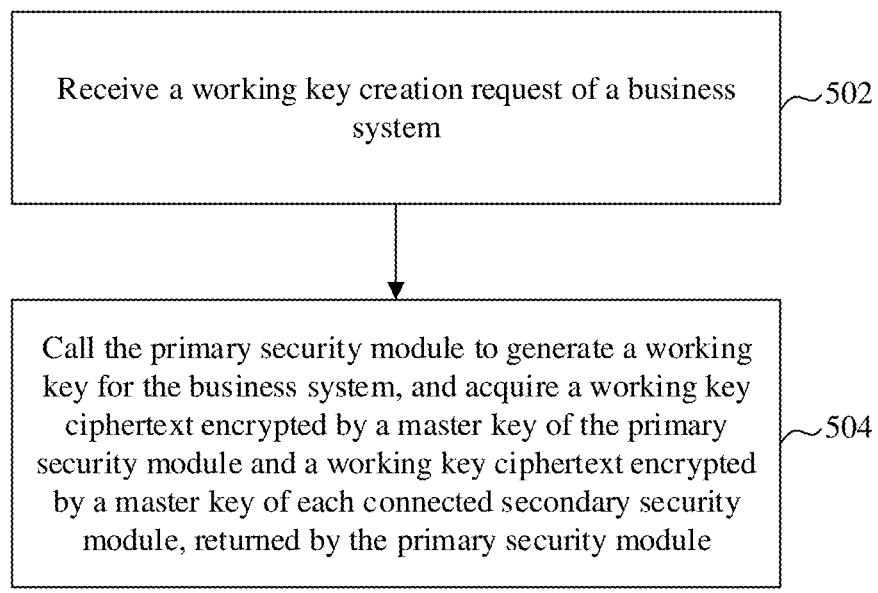
FIG. 5 is a flow chart of a working key creation method according to an example embodiment.

FIG. 5 is a flow chart of a working key creation method according to an example embodiment.

In step 502, a working key creation request of a business system is received.

In step 504, a primary security module is called to generate a working key for the business system. A working key ciphertext encrypted by a master key of the primary security module and a working key ciphertext encrypted by a master key of each connected secondary security module, returned by the primary security module, are acquired. The master key of the secondary security module is generated by the primary security module for the secondary security module by calling the primary security module.

In embodiments of the present specification, one of the security modules connected to the cryptographic service platform functions as the primary security module, and the key management function of the cryptographic service platform is provided by the primary security module. The primary security module is configured to generate a key, and the primary security module and other secondary security modules provide cryptographic operation functions required by the cryptographic service platform.

In an embodiment, master keys of the secondary security modules are generated by the primary security module, and the working key of the business system is also generated by the primary security module. In addition, the cryptographic service platform stores the working key ciphertext encrypted by the master key of the primary security module, and the working key ciphertext encrypted by the master key of each secondary security module. Therefore, in the embodiment, the master keys are stored in the primary security module. The master keys, which function as sensitive security parameter plaintexts, do not exceed a boundary of the security module, and the security of keys is not put at risk, thereby meeting key security requirements.

Embodiments of the present specification also provide a computer device, including: a processor, and a memory storing instructions executable by the processor, wherein the processor executes the instructions to: receive a cryptographic operation request initiated by a business system, the cryptographic operation request carrying data to be operated; determine a target security module responding to the cryptographic operation request, the target security module being one of a primary security module or at least one secondary security module, and a master key of the secondary security module being generated by the primary security module; acquire a working key ciphertext of the target security module, the working key ciphertext being a ciphertext that is obtained when the primary security module encrypts the working key using the master key of the target security module, the working key being created by the primary security module for the business system; and call the target security module using the working key ciphertext and the data to be operated as input, acquire an operation result returned by the target security module, and send the operation result to the business system, the operation result being obtained by the target security module by decrypting the working key ciphertext to obtain the working key using the stored master key, and then encrypting the data to be operated using the decrypted working key.

Embodiments of the present specification further provides a cryptographic service device, including: a processor, and a memory storing instructions executable by the processor, wherein the processor executes the instructions to: receive a working key creation request of a business system; and call a primary security module to generate a working key for the business system, and acquire a working key ciphertext encrypted by a master key of the primary security module and a working key ciphertext encrypted by a master key of each connected secondary security module, returned by the primary security module, the master key of the secondary security module being generated by the primary security module for the secondary security module by calling the primary security module.

The apparatus embodiments correspond to the method embodiments, and reference may be made to the description of the method embodiments for relevant parts. The apparatus embodiments described above are only illustrative. The modules described as separate components may or may not be physically separated. The components shown as modules may be located in one place, or may also be distributed onto multiple networks. Part or all of the modules may be selected according to actual needs.

Example embodiments of the present specification are described above. In some cases, the operations or steps recited in the claims can be performed in an order different from the orders in the example embodiments and still can achieve desired results. In addition, the processes depicted in the accompanying drawings do not necessarily require the shown particular order or a sequential order to achieve desired results. In some implementations, multitasking and parallel processing may be advantageous.

Other embodiments will be apparent to those skilled in the art from consideration of the specification. The present specification is intended to cover any variations, applications, or adaptations of the present specification following the general principles of the present specification and including common general knowledge or conventional technical means in the technical field not described in the present specification. The description and embodiments are only examples, and the true scope and spirit of the present specification are indicated by the following claims.

It should be understood that the present specification is not limited to the precise structure that has been described above and shown in the accompanying drawings, and that various modifications and changes can be made without departing from the scope thereof. The scope of the present description is only limited by the appended claims.

The invention claimed is:

1. A cryptographic operation method, comprising:
receiving a cryptographic operation request initiated by a business system, the cryptographic operation request carrying data to be operated;

determining a target security module responding to the cryptographic operation request, the target security module being one of a primary security module or at least one secondary security module, and a master key of the secondary security module being generated by the primary security module;

acquiring a working key ciphertext corresponding to the target security module, the working key ciphertext being obtained when the primary security module encrypts a working key using a master key of the target security module, the working key being created by the primary security module for the business system; and calling the target security module using the working key ciphertext and the data to be operated as input, acquiring an operation result returned by the target security module and sending the operation result to the business system, the operation result being obtained by the target security module by decrypting the working key ciphertext to obtain the working key using the master key of the target security module, and encrypting the data to be operated using the decrypted working key.

2. The method according to claim 1, wherein the master key of the secondary security module is obtained by:

acquiring a target public key generated by the secondary security module;

calling the primary security module using the target public key as input, generating, by the primary security module, the master key of the secondary security module, and encrypting the generated master key using the target public key to obtain a master key ciphertext; and sending the master key ciphertext to the secondary security module, and decrypting, by the secondary security module, the master key ciphertext using a target private key corresponding to the target public key to obtain the master key.

3. The method according to claim 2, wherein calling the primary security module using the target public key as input, and generating, by the primary security module, the master key of the secondary security module comprises:

acquiring a public key check value obtained when the primary security module performs message authentication code calculation on the target public key; and calling the primary security module using the target public key and the public key check value as input, and generating the master key of the secondary security module after the primary security module checks validity of the input target public key based on the public key check value.

4. The method according to claim 1, wherein the master key of the secondary security module is obtained by:

calling the primary security module, and acquiring two or more key components of the master key of the secondary security module after the primary security module generates the master key; and transmitting the two or more key components to key management entities, respectively, and transmitting, by the key management entities, the key components to the secondary security module respectively to generate the master key according to each key component.

5. The method according to claim 1, further comprising:

receiving and storing a master key ciphertext of the secondary security module returned by the primary security module, the master key ciphertext being encrypted by the master key of the primary security module.

6. A cryptographic service device, the cryptographic service device being connected to a primary security module, and comprising:

a processor; and a memory storing instructions executable by the processor, wherein the processor is configured to execute the instructions to operate as a registration module, a working key creation module, and a cryptographic operation calling module, wherein:

the registration module is configured to call the primary security module to generate a master key for a newly added secondary security module;

the working key creation module is configured to receive a working key creation request of a business system, call the primary security module to generate a working key for the business system, and acquire a working key ciphertext encrypted by a master key of the primary security module and a working key ciphertext encrypted by a master key of each secondary security module connected with the cryptographic service device; and the cryptographic operation calling module is configured to receive a cryptographic operation request of the business system, the cryptographic operation request carrying data to be operated; determine a target security module responding to the cryptographic operation request; call the target security module using a working key ciphertext corresponding to the target security module and the data to be operated as input, and obtain an operation result of the target security module, the operation result being obtained by the target security module by decrypting the working key ciphertext to obtain the working key using a stored master key, and encrypting the data to be operated using the working key.

7. The cryptographic service device according to claim 6, wherein the registration module is further configured to configure a master key of a secondary security module by:

acquiring a target public key generated by the secondary security module;

calling the primary security module using the target public key as input, generating, by the primary security module, the master key of the secondary security module, and encrypting the generated master key using the target public key to obtain a master key ciphertext; and sending the master key ciphertext to the secondary security module, and decrypting, by the secondary security module, the master key ciphertext using a target private key corresponding to the target public key to obtain the master key.

8. The cryptographic service device according to claim 7, wherein the registration module is further configured to:

acquire a public key check value obtained when the primary security module performs message authentication code calculation on the target public key; and call the primary security module using the target public key and the public key check value as input, and generate the master key of the secondary security module after the primary security module verifies validity of the input target public key based on the public key check value.

9. The cryptographic service device according to claim 6, wherein the registration module is further configured to configure a master key of a secondary security module by:

calling the primary security module, and acquiring two or more key components of the master key of the secondary security module after the primary security module generates the master key; and outputting the two or more key components to key management entities, respectively, and transmitting, by the key management entities, the key components to the secondary security module to generate the master key according to each key component.

10. The cryptographic service device according to claim 6, wherein the registration module is further configured to:

receive and store a master key ciphertext of a secondary security module returned by the primary security module, the master key ciphertext being encrypted by the master key of the primary security module.

11. A non-transitory computer-readable storage medium having stored therein instructions that, when executed by a processor of a device, cause the device to perform a cryptographic operation method, the method comprising:

receiving a cryptographic operation request initiated by a business system, the cryptographic operation request carrying data to be operated;

determining a target security module responding to the cryptographic operation request, the target security module being one of a primary security module or at least one secondary security module, and a master key of the secondary security module being generated by the primary security module;

acquiring a working key ciphertext corresponding to the target security module, the working key ciphertext being obtained when the primary security module encrypts a working key using a master key of the target security module, the working key being created by the primary security module for the business system; and calling the target security module using the working key ciphertext and the data to be operated as input, acquiring an operation result returned by the target security module and sending the operation result to the business system, the operation result being obtained by the target security module by decrypting the working key ciphertext to obtain the working key using the master key of the target security module, and encrypting the data to be operated using the working key.

12. The non-transitory computer-readable storage medium according to claim 11, wherein the master key of the secondary security module is obtained by:

acquiring a target public key generated by the secondary security module;

calling the primary security module using the target public key as input, generating, by the primary security module, the master key of the secondary security module, and encrypting the generated master key using the target public key to obtain a master key ciphertext; and sending the master key ciphertext to the secondary security module, and decrypting, by the secondary security module, the master key ciphertext using a target private key corresponding to the target public key to obtain the master key.

13. The non-transitory computer-readable storage medium according to claim 12, wherein calling the primary security module using the target public key as input, and generating, by the primary security module, the master key of the secondary security module comprises:

acquiring a public key check value obtained when the primary security module performs message authentication code calculation on the target public key; and calling the primary security module using the target public key and the public key check value as input, and generating the master key of the secondary security module after the primary security module checks validity of the input target public key based on the public key check value.

14. The non-transitory computer-readable storage medium according to claim 11, wherein the master key of the secondary security module is obtained by:

calling the primary security module, and acquiring two or more key components of the master key of the secondary security module after the primary security module generates the master key; and transmitting the two or more key components to key management entities, respectively, and transmitting, by the key management entities, the key components to the secondary security module respectively to generate the master key according to each key component.

15. The non-transitory computer-readable storage medium according to claim 11, the method further comprising:

receiving and storing a master key ciphertext of the secondary security module returned by the primary security module, the master key ciphertext being encrypted by the master key of the primary security module.

* * * * *